SEMICONDUCTIVE RADIATION-SENSITIVE DEVICE

Filed April 1, 1957

INVENTOR.
MELVIN L. SCHULTZ
BY
J. L. Whittaker
ATTORNEY

United States Patent Office 2,953,529

Patented Sept. 20, 1960

2,953,529

SEMICONDUCTIVE RADIATION-SENSITIVE DEVICE

Melvin L. Schultz, Princeton, N.J., assignor to Radio Corporation of America, a corporation of Delaware Filed Apr. 1, 1957, Ser. No. 649,726

4 Claims. (Cl. 252—62.3)

Figure 1:
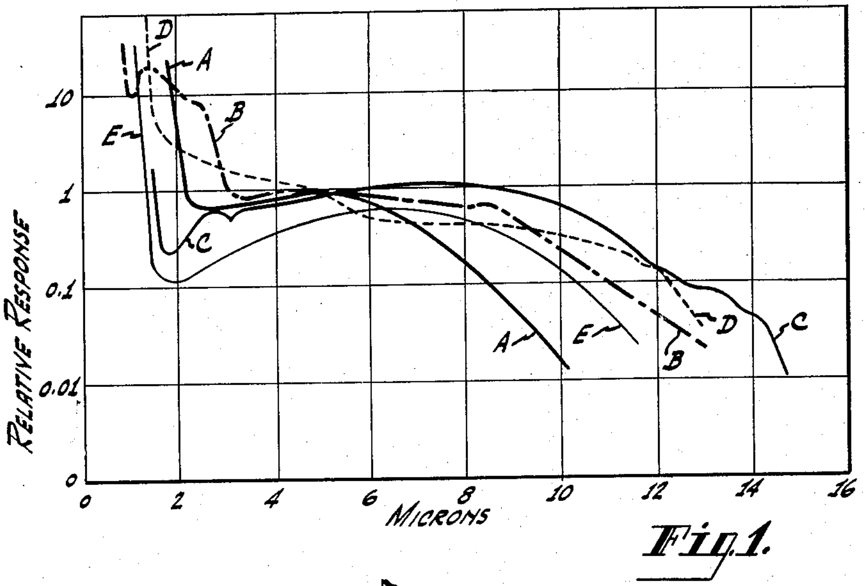

This invention relates to improved semiconductive materials and devices which are sensitive to radiations of relatively long infra-red wavelengths, particularly in the 8–14 micron range.

Radiant energy may be detected by utilizing a semiconductive material because conductivity of the material increases when radiant energy is received thereby. The conductivity of the material increases because the radiant energy increases the number of charge carriers in the material. In the case of intrinsically pure semiconductors like germanium and silicon, for example, these charge carriers (for example, electrons) are raised from the valence band into the conduction band of the material. It will be appreciated that the radiation must contain enough energy to raise the electrons across the gap between the upper edge of the valence band and the lower edge of the conduction band. The energy required to raise electrons across this gap in intrinsically pure germanium, for example, is about 0.7 e.v. In silicon the energy required is about 1.1 e.v. As used herein the term "band gap" is employed to define the energy required to raise an electron from the upper edge of the valence band to the lower edge of the conduction band.

At room temperatures only electromagnetic radiation of wavelengths of about 1.8 microns and shorter contains sufficient energy to raise an electron through the 0.7 e.v. band gap of germanium. Only radiation of wavelengths of less than about 1.2 microns contains enough energy to raise an electron through the 1.1 e.v. band gap of silicon. Thus at room temperature, detectors utilizing germanium are effective to detect radiation in the near infra-red region only and not for radiation of wavelengths for more than about 1.8 microns. Inasmuch as it is desirable to detect the radiation from the human body, for example, this is a serious disadvantage of intrinsically pure germanium or silicon since the maximum intensity radiation of the human body is of about 10 microns in wavelength. Radiation of wavelengths of this order, and in the 8–14 micron range in general, contains only enough energy to raise an electron through an energy difference of from about 0.09 to 0.15 e.v.

It is possible to incorporate foreign impurity atoms into a semiconductor crystal so that other energy differences may be obtained. Rather than refer to these energy differences which are due to the foreign impurities, as band gaps, the term "localized energy level" is employed and is intended to define the energy difference between the impurity centers and the edge of the valence or conduction band of the host material in which the impurity is incorporated. As used herein, the localized energy level may be established by a donor or acceptor impurity. The level is a donor level if it possesses an ionizable electron which can be excited from the impurity center into either the valence or conduction band; if it can accept an electron from the valence or conduction bands, it is referred to as an acceptor level.

The impurity centers in a semiconductor material, such as germanium or silicon which are established by foreign atoms, include charge carriers (electrons or holes) which are bound to the impurity center when not excited by externally applied energy. Localized energy levels between about 0.01 and 0.05 e.v. are easily established in a germanium body. It will be appreciated that these are rather small energy differences and thus less radiant energy is required to raise charge carriers to the valence or conduction bands. Because of these low energy differences (sometimes called ionization energies), ambient thermal energy above about 50° K. is sufficient to ionize or excite these charge carriers into the conduction band (in the case of electrons) or into the valence band (in the case of holes). It will thus be appreciated that with semiconductive materials having such localized energy levels established therein, it is difficult to determine whether excitation of the charge carriers is due to the effect of long wavelength radiation or ambient thermal energy.

One means to overcome this difficulty is to cool a semiconductor such as germanium to temperatures below 50° K. and preferably to less than 10° K. Such cooling reduces the thermal energy of the material and deionizes the impurity centers; that is, the charge carriers are condensed back to the localized energy levels associated with the impurity centers. This permits the energy present in long wavelengths radiation to raise the charge carriers through the relatively small energy gap of 0.01 to 0.05 e.v. at low temperatures such as 10° K. Such temperatures as those of 50° K. and lower, however, are not readily obtainable. In fact the most practically attainable low temperatures are those obtained with liquid nitrogen (about 60° to 77° K.). Hence in order to provide detection of long wavelengths with a semiconductor at the temperatures obtainable with liquid nitrogen and still be free of the effects of ambient thermal energy, it is necessary to provide the semiconductor material with a localized energy level greater than those of 0.01 to 0.05 e.v. mentioned heretofore. Semiconductor materials having a localized energy level of about 0.15 e.v., for example, have been provided heretofore. However, it has been found that the peak photoconductive response for such semiconductors at 77° K. occurs at wavelengths shorter than 8 microns (at about 5 microns, for example), the response trailing off to values lower by at least one order of magnitude for wavelengths in the 8–14 micron range.

It has been found that electromagnetic radiation of wavelengths of 8–14 microns contains enough energy to raise an electron through energy differences lying in the range of about 0.09 to 0.15 e.v. at temperatures obtainable with liquid nitrogen (about 60° to 77° K.). Hence it is desirable to provide a semiconductor material having a localized energy level in the range of 0.09 to 0.15 e.v. In fact radiation of both 8 and 14 microns wavelengths contains enough energy to raise a charge carrier through an energy difference of 0.1 e.v. Hence it is particularly desirable to provide a semiconductive material having a localized energy level of about 0.1 e.v. at temperatures obtainable with liquid nitrogen.

It is also important to provide a material with a localized energy level lying in the range of 0.09 to 0.15 e.v. because only radiation in the 8–14 micron range from low temperature sources, such as the human body, for example, is transmitted through the atmosphere.

Accordingly, it is an object of the instant invention to provide an improved semiconductor device which is more sensitive to wavelengths of 8 microns and longer.

Another object of the invention is to provide an improved semiconductor device which exhibits an energy gap between about 0.09 to 0.15 electron volt.

Another object of the invention is to provide an improved photosensitive semiconductor device.

Still another object is to provide an improved semiconductor device which is sensitive to radiation of wavelengths in the 8–14 micron region.

Another object of the invention is to provide an improved infra-red detector having a greater photoconductive response in the long wavelength region of 8 to 14 microns than heretofore attainable.

Another object is to provide an improved semiconductor device which is sensitive to radiation of about 8–14 micron wavelength at temperatures obtainable with liquid nitrogen.

Another object is to provide an improved semiconductor device having a localized energy level between about 0.09 to 0.15 electron volts at readily obtainable temperatures.

These and other objects and advantages of the invention are accomplished by distributing impurity materials capable of establishing ionization energies in the range about 0.09 to 0.15 electron volts in a semiconductive body of germanium-silicon alloy. These impurity materials are gold, copper, and indium, for example. It has been unexpectedly discovered that whereas the lowest localized energy level established by gold in germanium, for example, is about 0.05 electron volt, the corresponding energy level established by gold in a germanium-silicon alloy being dependent upon the alloy composition, may be established at any desired level between about 0.05 and 0.15 electron volts by employing an appropriate amount of silicon in the germanium-silicon alloy. Furthermore, materials having these localized energy levels when at the temperature of liquid nitrogen exhibit a photoconductive response at least one order of magnitude greater than previous semiconductor materials throughout a substantial portion of the long wavelength range between 8 and 14 microns. Thus, by employing the doped germanium-silicon alloys herein disclosed, a radiation detector may be provided which operates with greater sensitivity at readily accessible temperatures in the long infra-red wavelength region of 8 to 14 microns.

Figure 2:
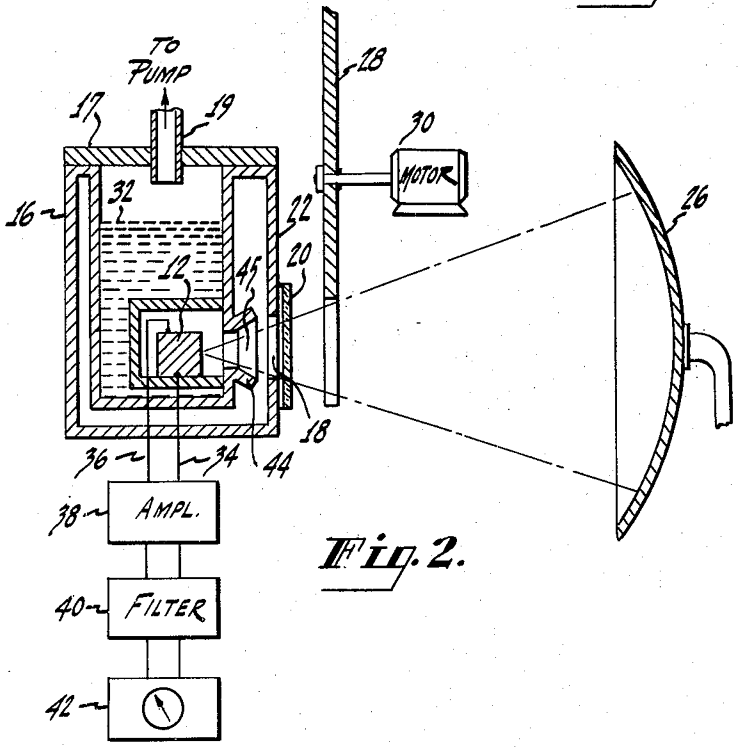

The invention will be described in greater detail by reference to the drawings in which:

Figure 1 shows curves of the spectral response vs. radiation wavelengths for the semiconductive materials herein disclosed as well as for a previously known semiconductive material; and Figure 2 is a schematic, cross-sectional, elevational view of an infra-red detector device utilizing the semiconductive materials herein disclosed.

MATERIALS

In order to make infra-red detecting devices in accordance with the present invention, a series of doped alloys of germanium and silicon were prepared which were, themselves, novel.

While single crystalline alloys are preferred, they are by no means essential. It has been found that both single crystalline and polycrystalline alloys exhibit practically the same properties which are of interest for radiation detection purposes. It will be noted that the following doped Ge-Si alloys exhibit ionization energies or localized energy levels which are dependent upon the amount of silicon in the alloy. As will be explained hereinafter, the impurity concentration is substantially the same in each crystal, the only variable being the percentage of silicon.

*Gold-doped* Ge-Si *alloys*

| Sample No. | Crystallinity | Atom Percent Si | $E_i$ in e.v. |
|---|---|---|---|
| 1 | Single | 0.0 | 0.052 |
| 2 | do | 5.5 | 0.069 |
| 3 | Poly | 7.2 | 0.074 |
| 4 | Single | 8.0 | 0.076 |
| 5 | do | 10.9 | 0.086 |
| 6 | Poly | 12.3 | 0.093 |
| 7 | do | 12.6 | 0.100 |
| 8 | do | 15.3 | 0.155 |

*Copper-doped* Ge-Si *alloys*

| Sample No. | Crystallinity | Atom Percent Si | $E_i$ in e.v. |
|---|---|---|---|
| 1 | Single | 0.0 | 0.046 |
| 2 | do | 3.7 | 0.054 |
| 3 | do | 6.4 | 0.069 |
| 4 | do | 9.3 | 0.095 |
| 5 | do | 10.5 | 0.107 |
| 6 | do | 11.0 | 0.111 |
| 7 | do | 12.0 | 0.117 |

The copper-doped Ge-Si alloys exhibit a linear relationship between ionization energy and silicon composition for the range between about 5 to 12% silicon. Furthermore it will be noted that the ionization energy level of 0.1 electron volt is obtained at a lower silicon percentage than the gold-doped Ge-Si alloys.

*Indium-doped* Ge-Si *alloys*

| Sample No. | Crystallinity | Atom Percent Si | $E_i$ in e.v. |
|---|---|---|---|
| 1 | Single | 0.0 | 0.01 |
| 2 | Poly | 69.6 | 0.071 |
| 3 | do | 82.9 | 0.120 |
| 4 | do | 84.9 | 0.133 |
| 5 | Single | 90.7 | 0.148 |
| 6 | do | 91.8 | 0.150 |
| 7 | do | 92.5 | 0.154 |
| 8 | do | 100.0 | 0.16 |

The ionization energies of indium-doped Ge-Si alloys thus also exhibit a dependence upon silicon composition. It should also be noted that the desirable ionization energy levels are obtained with indium when the alloy composition is silicon-rich rather than germanium-rich as is the situation with gold and copper.

In summary, by choosing the proper impurity (gold, copper, or indium) and the appropriate silicon composition, it is possible to provide semiconductor materials exhibiting ionization energies of between 0.01 and 0.16 electron volts. In the case of Ge-Si alloys with gold the range of silicon content is from about 10 to 15.0% in order to establish ionization energies in the more significant range of from 0.08 e.v. to 0.15 electron volts. For Ge-Si alloys with copper the silicon content is at least about 7.5% giving ionization energies in the more significant range of from 0.08 electron volts. In contrast, the Ge-Si alloys with indium are quite high in silicon content, varying from about 69% to about 93% Si and giving ionization energies of from 0.07 e.v. to 0.15 e.v. Thus broadly for all cases no less than about 7.5% nor more than 95% silicon is required. Thus for useful copper or gold Ge-Si alloys the silicon range is not less than about 7% nor more than about 20%, and for useful indium Ge-Si alloys the range of silicon is at least about 69% to not more than 95%.

As pointed out heretofore, what is desired is a material having an ionization energy of about 0.1 e.v. For energy levels substantially greater than 0.1 e.v. (i.e., more than 0.15 e.v.), more radiant energy per photon is required to raise a charge carrier from this level into the valence or conduction band. For example, there is sufficient energy in radiation of 8 microns wavelength but not enough in radiation of 14 microns wavelength to raise a charge carrier through an energy difference of 0.14 e.v. There is sufficient energy in radiations of wavelengths of both 8 and 14 microns, however, to raise a charge carrier through an energy difference of about 0.1 e.v. On the other hand, ionization energies greatly below 0.1 e.v. require increasingly lower and hence more difficultly obtainable cooling temperatures to blank out or prevent a response due to ambient thermal energy. It has been found that gold, copper, and indium have the ability to establish ionization energies around 0.1 electron volt in germanium-silicon alloys as has been shown.

RESPONSE OF DOPED Ge-Si ALLOYS

Referring now to Figure 1 the photoconductive response curves of various semiconductor alloys are shown. Curve A shows the spectral response of previously known gold-arsenic doped germanium at 77° K. While the photoconductive response for this semiconductor material is large for the shorter wavelengths below 8 microns, it will be noted that it rapidly trails off for wavelengths beyond 8 microns. Curve B shows the photoconductive response of the gold-doped Ge-Si alloy at 77° K. and identified as sample 6, supra, having 12.3 atom percent silicon. Curve B shows a more linear response for wavelengths between about 3 and 8 microns and a much higher response further out in the wavelength regions beyond 8 microns than the response of gold-arsenic doped germanium. Curve C shows the photoconductive response of the silicon-germanium alloy containing 10.9 atom percent silicon (sample 5) at 64° K. In comparison with curve A, the example of curve C exhibits a photoconductive response at least one order of magnitude greater for wavelengths out to about 15 microns. Curve D shows the photoconductive response of the copper-doped Ge-Si alloy at 60° K. identified as sample 5, supra, having 10.5% silicon. Curve D shows a photoconductive response at least one order of magnitude greater than that of the Au-As doped Ge example of curve A for wavelengths out to about 13 microns. Curve E shows the photoconductive response of the indium-doped Ge-Si alloy at 77° K. identified as sample 5, supra, having 90.7% silicon. Curve E shows a photoconductive response at least one order of magnitude greater than that of the gold-arsenic doped germanium example of curve A for wavelengths out to about 12 microns.

It has been noted heretofore that the photoconductive response in the 8–14 micron range at temperatures around 77° K. is of especial significance because of the fact that these temperatures (for example 60° K., 64° K., 77° K.) are most readily available by employing liquid nitrogen. It has been discovered that the photoconductive response of the various doped Ge-Si alloys in the wavelength range tested is temperature dependent, as the curves (B and C) for the gold-doped Ge-Si alloy example shows, and may be much improved by employing lower temperatures. While the temperature of liquid nitrogen is generally taken to be about 77° K., temperatures such as 60° and 64° K. are readily attainable by decreasing the pressure over the nitrogen, for example.

Figure 1 includes curves showing the relative photoconductive response of one gold-doped Ge-Si example (10.9 atom percent Si) at 64° K. (curve C) and another gold-doped Ge-Si alloy (12.3 atom percent Si) at 77° K. (curve B). In order to avoid having too many curves on the graph of Figure 1, the photoconductive responses at other temperatures are not shown. The photoconductive response for the 10.9% silicon sample at 4° K., the temperature of liquid helium, is about one order of magnitude greater for wavelengths from about 12 to 15 microns than the response value for 11 microns at 77° K. The response is very linear over the entire range of 2 to 14 microns and extends well out beyond the 14 micron wavelength region at peak response values. Hence it will be appreciated that a far superior radiation detector for wavelengths between 8 and 14 microns can be obtained with the doped germanium-silicon alloys herein disclosed when temperatures as low as 4° K. are obtained. The copper-doped Ge-Si sample containing 10.5% Si described previously likewise exhibits a very linear photoconductive response at 4° K. over the entire range from 2 to 14 microns and is about a half an order of magnitude greater from 10 to 14 microns than the photoconductive response value for 10 microns at 60° K.

PREPARATION AND DOPING OF Ge-Si ALLOYS

The doped Ge-Si materials may be prepared by techniques well known in the art of semiconductive materials. Several methods are available for introducing the impurities into the Ge-Si alloys. For example, the impurities may be incorporated in a melt of germanium and silicon from which a crystal is grown or the impurity may be diffused into a grown, solidified crystalline body of alloyed germanium and silicon. Germanium-silicon crystals may be prepared and grown by the known technique of contacting a seed crystal of either germanium or silicon to a melt of germanium and silicon and slowly withdrawing it. To obtain single crystals of germanium-silicon alloys the method disclosed in a copending application of Rover V. Jensen, Serial No. 435,783, filed June 10, 1954, now abandoned and assigned to the instant assigness is preferred. Single crystals of germanium-silicon alloy having any composition may be obtained by the method disclosed by Jensen wherein the silicon is gradually added to the melt of germanium in increasingly larger amounts and built up to the particular concentration desired. The method is applicable to either vertical or horizontal crystal-growing techniques. If horizontal crystal-growing techniques are preferred, increasingly larger pieces of silicon are placed in contact with a germanium ingot along its length with the smallest portion of silicon being nearest the initially melted end of the Ge ingot so that as the molten zone travels along the ingot more and more silicon is gradually introduced into the melt and hence into the solidifying crystal.

In doping (that is, introducing impurities into the Ge-Si crystal), it is preferred to employ diffusion techniques for gold and copper impurities. Because of its low diffusion constant it is preferred to introduce indium directly into the melt of germanium and silicon when preparing the alloy. Gold and copper readily diffuse into Ge-Si alloys; hence the preference. In the following examples, it should be appreciated that the diffusion time is determined both by the size of the Ge-Si alloy body and by the temperature and therefore is only exemplary for the particular sized samples described.

It has been found in general that the concentration of the impurity in the Ge-Si alloy to establish the desired energy levels should be at least about $10^{14}$ impurity atoms per cc. of alloy. Greater amounts of impurity up to saturation can be incorporated in the Ge-Si alloys to advantage since the fraction of the incident radiation absorbed is proportional to the concentration of the impurity. The greater the amount of energy absorbed, the greater the change in conductivity and hence the stronger the output signal. Satisfactorily doped Ge-Si alloys may be obtained very conveniently by initially employing more than enough impurity to saturate the crystal lattice of the alloy with atoms of the impurity.

*Example 1.*—A germanium-silicon alloy containing 10.9% silicon in the form of a bar about 1.5×1.5×6 mm. is coated with gold as by electroplating or dipping the bar into a gold chloride solution. It is only necessary to provide an excess of gold on the bar and this is readily determined by examination: a visible deposit of gold is an excess and satisfacory. Thereafter the bar is heated in vacuo or an inert atmosphere at a temperature of about 900° C. The atmosphere preferably is dry and oxygen free. After about 48 hours the bar is saturated with diffused atoms of gold. The bar is then tapped and etched to remove the surface layer and electrical contacts are applied, as by soldering for example, and it is ready for use in a radiation detector device.

*Example 2.*—A germanium-silicon alloy containing 10.5% silicon in the form of a cube of about 5 mm. is plated with copper to a visible extent and then heated in vacuo for about 6–9 hours for example, at a temperature of about 875° C. by which time the cube is saturated with diffused atoms of copper. In order to minimize precipitation of copper (due to its lower solubility at lower temperatures) it is necessary to cool the cube from the diffusion temperature down to about 500° C. as rapidly as possible. Thereafter the cube may be lapped and etched, as described for the gold-doped example, and electrical leads secured thereto.

*Example 3.*—About 12.5 grams of germanium and 27.5 grams of silicon are placed in a crucible with 100 milligrams of indium. The temperature is raised to about 1380° C. until the contents of the crucible are completely molten. A seed crystal of silicon is then contacted to the surface of the melt and slowly withdrawn at the crystallizing rate therefrom as a crystal forms attached to the seed. The single crystal thus obtained comprised about 15.5 g., total weight, and had a composition of between 93 to 91 atom percent silicon. The solidified single crystal ingot thus obtained is then cut up into appropriately-sized cubes, for example, which may be lapped and etched as described heretofore and then provided with electrical leads, also as described.

DEVICE

A typical device utilizing the doped germanium-silicon alloys disclosed herein is illustrated in Figure 2. A block 12 cut from a crystal of gold doped germanium-silicon alloy, containing 10.9 atom percent Si, for example, as described heretofore is soldered to an inner wall of a metal vacuum jar 16. The block may be conveniently a cube about 0.5 cm. on a side and is made as large as is practical in order to provide maximum radiation absorption in the block. It is preferably placed within the vacuum chamber of the jar in order to minimize any contamination and heat loss that may affect it. A window 18 is cut in the outer wall 22 of the jar opposite the block. In order to control the pressure over the metal vacuum jar 16, a cover 17 is hermetically sealed to the top of the jar. This cover is provided with a pipe 19 connecting the jar to a mechanical pump, for example. The window may be covered with any convenient infra-red radiation-transparent material 20 such as pure silicon or germanium or even silver chloride or rock salt. The germanium or silicon window may be coated with a thin layer of silicon monoxide or zinc sulfide to reduce reflection losses. A pane of this material may be sealed in place by any convenient means such as wax or a cement. Germanium or silicon windows may be sealed by soldering with indium or tin, for example.

The block is preferably shielded from all heat radiation except that which is directed upon it by the reflector 26. Shielding may be conveniently provided by the conical visor 44 having an aperture 45 aligned with the radiation window 18.

Infra-red radiation is directed upon the block through the window by the reflector 26 which serves to concentrate received radiation and to provide sensing directivity. A chopping disc 28 driven by a motor 30 is provided adjacent the window periodically to interrupt the received signal. Periodic interruption of the received radiation is desirable because when subjected to pulsating radiation the device produces a constant or slowly modulated but rapidly pulsating signal which may be more readily amplified than a constant or slowly modulated D.-C. signal.

The vacuum jar is partially filled with liquid nitrogen 32 which serves to cool the wafer to a temperature of about 64° K., which temperature is attained by decreasing the pressure over the nitrogen by means of a vacuum pump, for example. Electrical leads 34 and 36 are connected to opposite sides of the block and serve to connect the crystal to an amplifier 38. The amplifier is provided with biasing means so that in effect it constantly measures the conductivity of the wafer and amplifies the change of conductivity produced in the wafer by the impressed radiation. The amplified signal is fed through a filter 40 designed to reduce noise and may be displayed on a meter 42 or any other convenient indicating device.

A device such as that illustrated exhibits a flat maximum sensitivity to radiation from about 4 microns to about 10 microns and also has useful sensitivity to about 14 microns. The degree of sensing directivity may be controlled according to known principles as by varying the size and shape of the reflector.

Infra-red sensing devices utilizing materials according to the instant invention may be conveniently operated at temperatures obtainable with liquid nitrogen. Improved sensitivity may be obtained by operating such devices at lower temperatures but temperatures substantially lower than the boiling point of nitrogen are relatively difficult to provide. With somewhat decreased sensitivity in the longer wavelength regions, materials according to the invention may also be utilized in infra-red detection devices that operate at temperatures up to about 200° K.

There have thus been described improved infrared-sensitive semiconductive materials, methods of making these materials, and devices utilizing them.

What is claimed is:

1. An infrared radiation-detecting device including a body of crystalline germanium-silicon alloy having in its crystal lattice atoms of an element selected from the group consisting of gold, copper and indium, the concentration of said element in said alloy being at least about $10^{14}$ atoms per cc., the silicon content of said alloy being from about 7 to 20% when said element is gold or copper and about 69 to 95% when said element is indium, whereby an ionization energy level between about 0.08 and 0.14 electron volts is established in said body.

2. An infrared radiation-detecting device including a body of crystalline germanium-silicon alloy having in its crystal lattice at least $10^{14}$ atoms of gold per cc., the silicon content of said alloy being from about 10 to 15%, whereby a predetermined ionization energy level between about 0.08 and 0.14 electron volts is established in said body.

3. An infrared radiation-detecting device including a body of crystalline germanium-silicon alloy having in its crystal lattice at least $10^{14}$ atoms of copper per cc., the silicon content of said alloy being from about 7 to 20%, whereby a predetermined ionization energy level between about 0.08 and 0.14 electron volts is established in said body.

4. An infrared radiation-detecting device including a body of crystalline germanium-silicon alloy having in its crystal lattice at least $10^{14}$ atoms of indium per cc., the silicon content of said alloy being from about 69 to 95%.

References Cited in the file of this patent

UNITED STATES PATENTS

| | | |
|---|---|---|
| 2,547,173 | Rittner | Apr. 3, 1951 |
| 2,600,997 | Lark-Horovitz | June 17, 1952 |
| 2,671,154 | Burstein | Mar. 2, 1954 |
| 2,701,326 | Pfann et al. | Feb. 1, 1955 |
| 2,788,381 | Baldwin | Apr. 9, 1957 |
| 2,847,544 | Taft, Jr. et al. | Aug. 12, 1958 |
| 2,858,275 | Folberth | Oct. 28, 1958 |

OTHER REFERENCES

Levitas: "Electrical Properties of Germanium-Silicon Alloys," Physical Review, vol. 99, No. 6, Sept. 15, 1955.

Dunlap, Jr.: "Gold as an Acceptor in Germanium," Physical Review, vol. 97, No. 3, Feb. 1, 1955.

Collins et al.: "Properties of Gold-Doped Silicon," Physical Review, vol. 105, No. 4, Feb. 15, 1957.